March 25, 1969    D. N. RENNEKER ET AL    3,434,367
STEERING COLUMN
Filed Sept. 1, 1967    Sheet 1 of 2
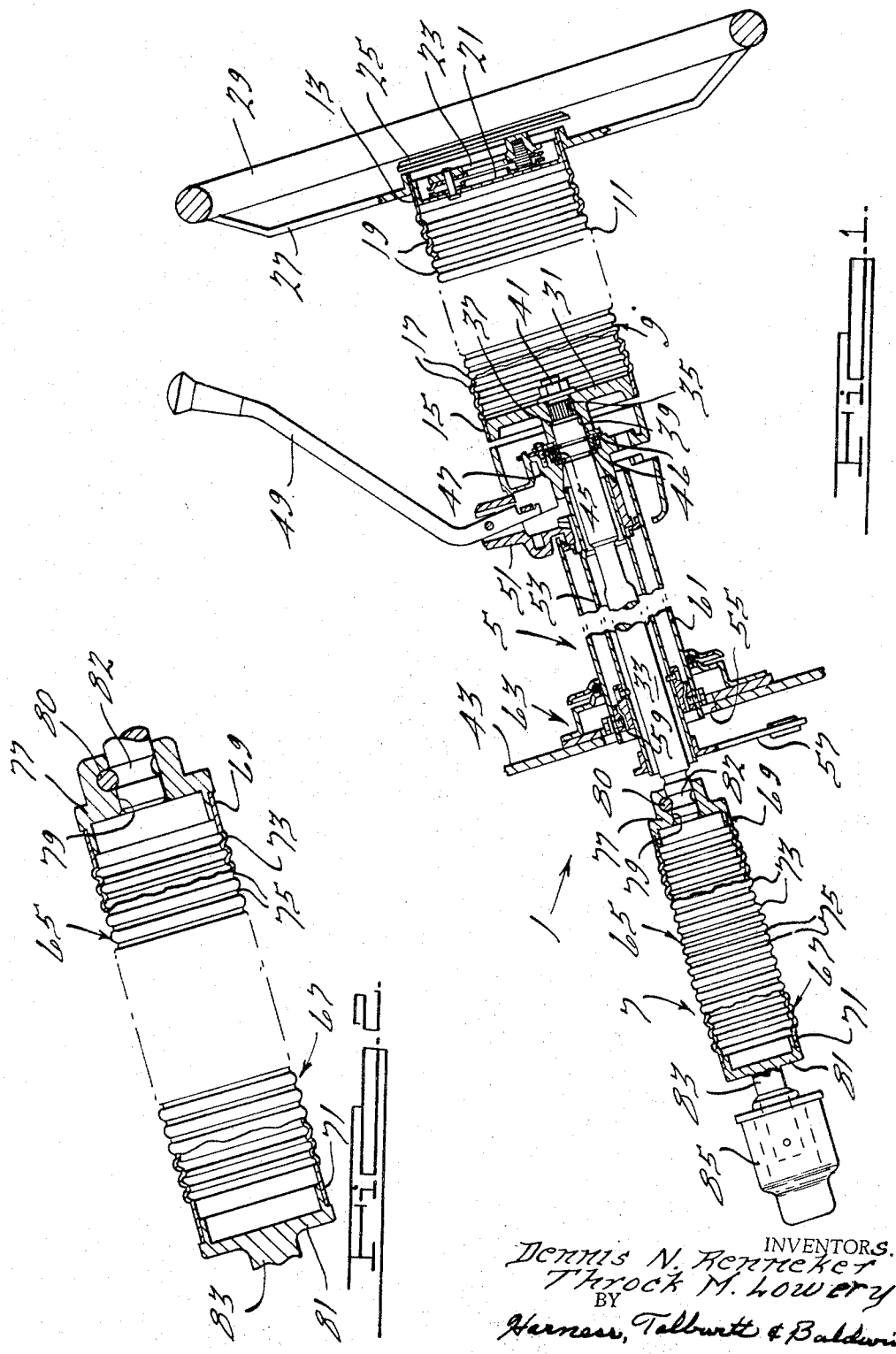
INVENTORS.
Dennis N. Renneker
Throck M. Lowery
BY
Harness, Talburtt & Baldwin
ATTORNEYS.

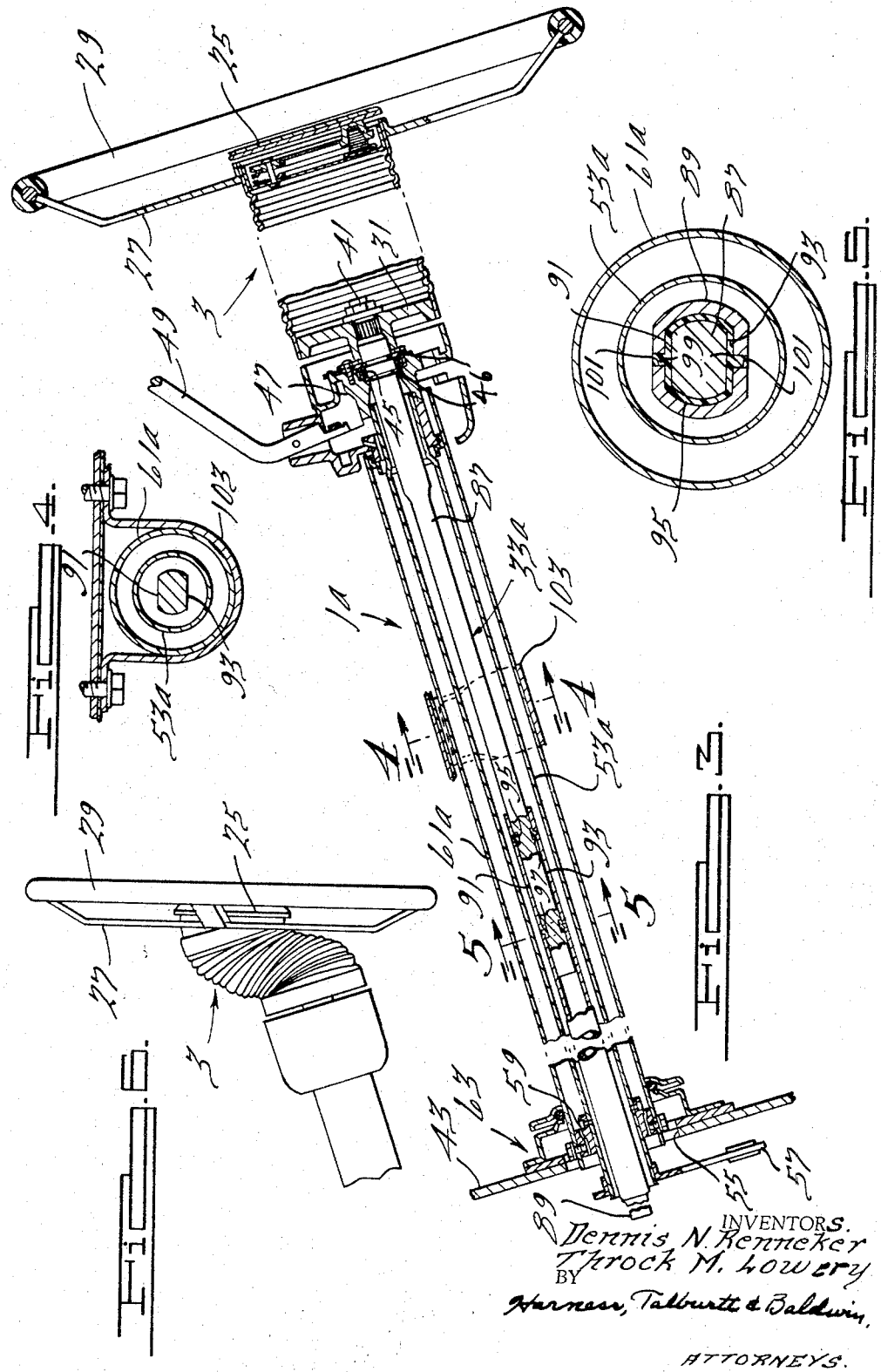

United States Patent Office 3,434,367
Patented Mar. 25, 1969

3,434,367
STEERING COLUMN
Dennis N. Renneker, Warren, and Throck M. Lowery, Bloomfield Township, Oakland County, Mich., assignors to Chrysler Corporation, Highland Park, Mich., a corporation of Delaware
Filed Sept. 1, 1967, Ser. No. 665,061
Int. Cl. B62d 1/18
U.S. Cl. 74—492          10 Claims

ABSTRACT OF THE DISCLOSURE

Steering column having yieldable members at the upper and lower ends thereof adapted to deform independently of one another. The column jack and the shift tube are of a noncollapsible nature, while the yieldable members are shown in two forms, one being a thin walled hollow cylindrical member having a series of individual annular convolutions therein, and the other being a pair of mating telescoping steering shaft members.

BACKGROUND OF THE INVENTION

This invention relates to vehiclular steering columns, and more particularly to an impact-absorbing steering column.

Steering columns of the type adapted to collapse upon impact at one end or the other have long been known. Some relatively early collapsible steering columns, such as shown in U.S. Patent 2,028,953, for example, issued Jan. 28, 1936, utilized a dash pot concept with oil or other fluid being forced out of a chamber by one end of a steering shaft section upon impact.

More recently, telescoping steering columns, such as shown in U.S. Patent 2,836,079, for example, issued May 27, 1958, have been developed, wherein one column member telescopes over another upon impact. Other recent developments include a hollow deformable body attached to the upper end of a steering column and extending upwardly beyond the plane of the steering wheel. Still more recently, steering columns having a length of expanded metal therein adapted to collapse at a controlled rate upon impact have been developed.

The latter columns usually surround a shift tube and a steering shaft assembly each formed of a plurality of sections adapted to telescope relative to one another upon impact and held against inadvertent telescoping by plastic keys injected in mating recesses or openings in the parts. Thus, the outer column, the shift tube, and the steering shaft assembly all had to be constructed to shorten upon impact. This resulted in a relatively expensive construction. Moreover, when the vehicle driver is thrown against the steering wheel, the angle of impact upon the wheel has to some degree an effect on the force component tending to collapse the steering column, i.e., the more the impact force is axially nonaligned with the column, the more the force has to be to cause the column to collapse. Furthermore, the column parts above the areas in which they are designed to collapse at a controlled rate have a certain mass, and obviously this mass must be accelerated by the impact of the driver on the steering wheel before the column will collapse. Thus, some of the force exerted by the driver must be used to accelerate the mass of the steering column parts. According to the present invention, the number of parts which have to be collapsible and the mass of the parts which must be accelerated upon impact are reduced.

SUMMARY OF THE INVENTION

Briefly, this invention comprises a steering column apparatus having an upper collapsible or yieldable member adjacent the steering wheel and a lower collapsible or yieldable member adjacent the lower end of the column.

One of the primary objects of the present invention is to provide an improved vehiclular steering column which adapted to collapse at a controlled rate upon impact of the driver with the steering wheel.

Another object of this invention is to provide a steering column of the type described in which fewer parts collapse upon impact of the driver and steering wheel.

A further object of this invention is to provide a steering column such as described in which the impact of the driver and the steering wheel is readily absorbed regardless of the direction of impact between the driver and the wheel.

Still another object of this invention is to provide a steering column of the class described in which the column is adapted to collapse readily when a predetermined force is applied axially thereto but less force is required to collapse the column when the force is applied at an angle relative to the axis of the column than when the force is applied axially.

A further object of this invention is to provide a steering column of the type described which is adapted to collapse upon impact at either end thereof.

Another object of this invention is to provide a steering column such as described which is economical in construction and effective in operation.

Other objects will become apparent as the description progresses.

BRIEF DESCRIPTION OF THE DRAWINGS

Referring now to the drawings, in which two of various possible embodiments are illustrated.

FIG. 1 is a side elevation, partly in section, of one embodiment of a steering column constructed in accordance with this invention;

FIG. 2 is an enlarged fragmentary view of FIG. 1;

FIG. 3 is a side elevation similar to FIG. 1 illustrating another embodiment of this invention, certain parts being shown in section;

FIGS. 4 and 5 are enlarged sections taken along lines 4—4 and 5—5, respectively, of FIG. 3; and FIG. 6 is a side elevation of the upper portion of either of the embodiments shown after the column has collapsed in one manner.

Like parts are indicated by corresponding reference characters throughout the several views of the drawings.

DESCRIPTION OF THE PREFERRED EMBODIMENTS

Referring now to the drawings, one embodiment of a steering column constructed in accordance with this invention is illustrated in FIG. 1 at 1. Column 1 is basically formed of three interconnected sections, namely, an upper impact-absorbing section 3, a middle noncollapsible section 5, and a lower impact-absorbing section 7.

Upper section 3 includes a thin walled hollow cylindrical member 9 having a plurality of series of individual convolutions 11 arranged adjacent one another preferably from one annular end margin 13 to the opposite annular end margin 15. Convolutions 11 form a series of annular ridges 17 alternating with a series of annular recesses or valleys 19. As stated, the convolutions preferably extend from one end portion to the other end portion of the cylindrical member 9. However, as will be apparent, the number and spacing between any two convolutions may vary depending upon the results desired. In any event, the convolutions form adjacent areas of weakness which permit the cylindrical member to (1) collapse at a controlled rate upon the application of a predetermined load axially upon the upper end of the column or (2) deform or yield upon the application of a predetermined load on the upper portion of the steering column at an angle to the axis of the column as explained hereinafter.

The inside surface of upper annular margin 13 is securely connected, as by welding, for example, to an end head 21 which carries horn switch components 23. A horn ring ornament member 25 overlies switch components 23 and is adapted to actuate the latter in a conventional manner. Spokes 27 of a steering wheel 29 are connected, by welding, for example, to the outside surface of upper end head 13 and underlie horn ring ornament member 25. A lower end head 31 is securely connected to the inside of lower annular margin 15.

Section 5 of column 1 includes a steering shaft 33, the upper end of which is knurled and extends through a bore 35 in end head 31. Shaft 33 has an annular shoulder 37 seated against a shoulder 39 in end head 31 to prevent movement of end head 31 toward the lower end of shaft 33. A nut 41 prevents movement of end head 31 axially away from shaft 33. Shaft 33 extends down through floor 43 and is rotatably supported at its upper end by a bearing 45 in a bearing housing 47. Suitable retaining means, such as snap rings 46 are provided on opposite sides of bearing 45 to prevent axial movement of the shaft 33 relative to housing 47.

A transmission or gearshift lever 49 extends through a gear shift housing 51 connected to the upper end of a transmission selector torque tube 53. Transmission selector torque tube, or more simply, shift tube 53, surrounds steering shaft 33 and extends downwardly through an opening 55 in floor 43. Tube 53 has a shift tube lever 57 attached to the lower end thereof below floor 43 adapted to be connected to a transmission operating assembly (not shown). Tube 53 is preferably formed as a one-piece noncollapsible member, the lower end portion of which is rotatably supported by a bearing 59 mounted in the lower end of a tubular steering column jacket 61. Jacket 61 is attached to floor 43 by a mounting plate assembly 63 and extends upwardly, around shift tube 53, to housing 51. The upper end of column jacket 61 may be secured to the housing 51. Like shaft 33 and tube 53, jacket 61 is preferably formed as a one-piece noncollapsible member.

Lower section 7 comprises a lower hollow thin walled cylindrical member 65 having a series of individual convolutions 67 preferably extending from one annular end margin 69 to the opposite annular end margin 71. Convolutions 67 form a series of annular ridges 73 alternating with a series of annular recesses or valleys 75. Like the convolutions 11 of hollow cylindrical member 9, convolutions 67 form adjacent areas of weakness which permit the member to collapse at a controlled rate or deform upon the application of a predetermined load thereto. End margin 69 is connected, as by welding for example, to the outside of an upper end head 77 which has a central bore 79. The lower end of steering shaft 33 is secured in bore 79 against axial and rotatable movement relative to member 65 by any suitable means, such as a pin 80 passing over a flat in a groove 82 in shaft 33, for example.

The lower margin 77 of member 65 is secured to the outside surface of a lower annular end head 81 having a stub shaft portion 83 extending axially away from member 65. Shaft 83 is connected to a coupling 85 adapted to be joined to a steering gear mechanism (not shown).

Operation of the steering column 1 under vehicle impact conditions is as follows:

Assuming first that the front end of the vehicle collides with another object. Initially, the impact tends to move the steering gear (not shown) and the coupling 85 rearwardly as the vehicle driver's torso begins to move toward the steering wheel. The impact absorbing characteristics of the lower section 7 will be described first.

When the steering gear (not shown) and coupling 85 are driven rearwardly by the impact, the force thereof is transmitted through member 65, shaft 33 and snap rings 46 to the housing 47 which is secured to the instrument panel by suitable fastening means (not shown). Normally, during a direct front end collision, the coupling 85 tends to be driven rearwardly and upwardly in a generally axial direction relative to steering shaft 33. The force exerted on hollow cylindrical member 65, if of a predetermined magnitude, will cause the member 65 to collapse at a controlled rate in more or less accordion fashion preventing rearward movement of shaft 33. The steering shaft 33 does not move axially due to the split rings connection 46 between the shaft and the housing 47. The material from which member 65 is constructed, the thickness of the annular wall, the size and spacing of the convolutions and the size of the member per se, are all factors which determined the axially applied force necessary to cause the member to collapse at a controlled rate. As set forth above, the force applied to the lower end of member 65 upon impact is usually generally axial in direction. However, if the force is applied at an angle relative to the shaft axis, the member may yield by bending as well as in an accordion fashion. In any event, the steering shaft 33 remains generally stationary relative to the floor 43 and instrument panel (not shown).

As mentioned previously, upon impact, the vehicle driver continues forward toward the steering wheel. If the vehicle driver is wearing a lap belt, the driver's torso may tend to swing toward the steering wheel at the same time the driver's complete body is being thrown forward against the lap belt. As a result the front of the torso may be generally parallel with the plane of the steering wheel as the torso and wheel meet, and a generally axial impact force may be applied to the wheel. However, as made apparent hereinafter, the direction in which the force is applied by the torso will not prevent yielding of the upper member 9 if the force has a predetermined magnitude.

The force of the torso impact is transmitted through the steering wheel 29 and horn ornament 25, member 9, end head 31, the upper end portion of steering shaft 33 and snap rings 46 to the housing 47. If the impact force is of a predetermined magnitude, the member 9 will begin to collapse in generally accordion fashion, thus absorbing some of the impact. It will be noted that the steering shaft 33, shift tube 53 and column jacket 61 remain relatively stationary and it is unnecessary to accelerate any of these components to absorb the impact.

If the lap belt yields during impact, or if the lap belt is not being utilized by the driver, the driver's torso may approach the steering wheel at an angle other than axially during a collision. For example, the driver's torso might be in a generally vertical position as it makes contact with the steering wheel. In such a case, a bending movement, as well as an axial force, will be applied to the upper impact absorbing member 9, causing the latter to bend as well as deform in an accordion fashion. The result of an actual test on the upper portions of a steering column of this invention is illustrated in FIG. 6.

It will be understood that with any given predetermined force, the member 9 offers the most resistance to deformation when that force is applied axially. The greater the angle between the axis of shaft 33 and the direction in which the impact force is applied, the smaller the force may be to cause deformation. Thus, the member may be designed to collapse at a controlled rate upon the application of a predetermined axial force, and also designed to deform upon the application of smaller forces applied at various angles to the steering wheel. In this regard, it is to be noted that the member 9 will deform if, for example, the vehicle is hit by another vehicle on the right hand side (passenger side) and a passenger is thrown across the front seat against the side of the steering wheel. Moreover, the driving positions assumed by drivers vary greatly from a standard position, with some drivers being seated to the left of the steering shaft and some drivers hunched over one or the other sides of the steering wheel. Furthermore, due to different leg lengths, drivers sit at varying distances from the steering wheel. The steering column of this invention is adapted, if the impact force is of a predetermined magnitude, to absorb some of the impact upon the steering wheel regardless of the angle at which the force is applied.

An alternative embodiment is illustrated at 1a in FIGS. 3, 4 and 5. The upper section of the steering column 1a is similar to column 1 as shown by the corresponding reference characters. The column jacket 61a, shift tube 53a, and steering shaft 33a are constructed differently than their counterparts in column 1.

Shaft 33a is constructed of two pieces 87 and 89. The upper piece 87 is solid and has double flats 91 and 93 on its lower end. It slides down into the hollow lower shaft 89 which has a mating double flatted contour. Shaft 89 extends through the vehicle floor in the same manner as shaft 33. The lower end of the shaft extends beyond the vehicle floor to a steering gear coupling (not shown). The mating flats on piece 87 and piece 89 enable the steering shaft 33a to transmit the turning force of the steering wheel to the steering gear.

Injected plastic rings or collars 95 located in grooves 97 of piece 87 have projections 99 extending outwardly through holes 101 in lower tubular piece 89 for staking the pieces 87 and 89 together. The collars take up any clearance between the two mating shafts 87 and 89, and provide a controlled resistance to the telescoping action of the shaft when it is impacted.

Shift tube 53a and column jacket 61 surround shaft 33a and are connected to the housing 51 and the vehicle floor in the same manner as illustrated in FIG. 1. If desired a U-shaped bracket 103 may be utilized for providing an additional connection between column jacket 61a and the vehicle instrument panel (not shown). It will be understood that a bracket 103 could also be employed in the FIG. 1 embodiment, if desired.

Operation of the steering column 1a under impact conditions is as follows:

As the steering gear, coupling 85, and tubular shaft 89 are driven rearwardly and upwardly by the impact, the plastic projections 99 are sheared along the mating surfaces of shafts 87 and 89, and shaft 89 telescopes over shaft 87. The shaft 87 remains relatively stationary with regard to the instrument panel due to the snap rings 46. Thus, the steering shaft 33a is not driven into the driver area.

The cylindrical member 9 will deform upon impact of a vehicle occupant in the same manner as the member 9 of the embodiment shown in FIG. 1.

It will be seen that a steering column constructed in accordance with this invention is adapted to deform at either end without requiring the column jacket, the shift tube, or the steering shaft to be accelerated by the force applied to the steering wheel, thus substantially reducing the force necessary just to accelerate the mass of the impact absorbing components and thereby permitting nearly all of the impact force to be absorbed by the impact absorbing member. Moreover, the column is adapted to deform upon impact forces above a predetermined value regardless of the direction in which the force is applied to the ends of the column.

In view of the foregoing it will be seen that the several objects and other advantages of this invention are achieved.

Although only two embodiments of the invention have been disclosed and described, it is apparent that other embodiments and modifications of the invention are possible.

We claim:
1. An impact absorbing steering column adapted to be connected to a steering gear, said column comprising a steering wheel, a first yieldable member connected to said steering wheel, means connected to said first yieldable member and adapted to be connected to the steering gear for transmitting rotational movement of said steering wheel and first yieldable member to said steering gear, said means including a second yieldable member, said first yieldable member being adapted to absorb impact upon said steering wheel, and said second yieldable member being adapted to shorten upon impact against the lower end of said steering column, said yieldable members being adapted to yield upon impact thereon independently of one another.

2. An impact absorbing steering column as set forth in claim 1 including a shift tube, and a tubular steering column jacket surrounding said means, said tube and jacket being less yieldable than said yieldable members and adapted to remain substantially intact without substantial deformation when said members are impacted.

3. An impact absorbing steering column as set forth in claim 1 wherein said first yieldable member comprises a hollow generally cylindrical member, said hollow member having a relatively thin wall, said wall having a plurality of annular ridges therein separated from one another by a plurality of annular recesses, end heads at opposite ends of said hollow member secured to the end margins of said wall, one of said end heads being connected to said means, the end of said hollow member opposite said one end head being connected to said steering wheel.

4. An impact absorbing steering column as set forth in claim 1 wherein said means includes a steering shaft, said second yieldable member comprising a hollow generally cylindrical member, end heads secured to opposite ends of said hollow member, one end head being connected to said steering shaft, the other end head being connected to said steering gear, said hollow member having a relatively thin wall, said wall having a plurality of ridges therein separated from one another by a plurality of annular recesses, said hollow member, upon the application of a predetermined axial force on one end thereof, being adapted to deform in generally accordion fashion.

5. An impact absorbing steering column as set forth in claim 1 wherein said second yieldable member includes a steering shaft means, said steering shaft means comprising first and second members telescopingly nested together at one end of each of said first and second members, the other end of said first telescoping member being connected to said first yieldable member, the other end of said second telescoping member being connected to said steering gear, said telescoping members having aligned recesses in their mating surfaces, and plastic members in said recesses adapted to shear generally along the mating surfaces upon the application of a predetermined force on said other end of said second telescoping member.

6. An impact absorbing steering column as set forth in claim 2 wherein said first yieldable member comprises a hollow generally cylindrical member, said hollow member having a relatively thin wall, said wall having a plurality of annular ridges therein separated from one another by a plurality of annular recesses, end heads at opposite ends of said hollow member secured to the end margins of said wall, one of said end heads being connected to said means, the end of said hollow member opposite said one end head being connected to said steering wheel.

7. An impact absorbing steering column as set forth in claim 6 wherein said means includes a steering shaft, said second yieldable member comprising a second hollow generally cylindrical member, end heads secured to opposite ends of said second hollow member, one end head of said second hollow member being connected to said steering shaft, the other end head of said second hollow member being connected to said steering gear, said second hollow member having a relatively thin wall, said wall having a plurality of ridges therein separated from one another by a plurality of annular recesses, said second hollow member, upon the application of a predetermined axial force on one end thereof, being adapted to deform in generally accordion fashion.

8. An impact absorbing steering column as set forth in claim 6 wherein said second yieldable member includes a steering shaft means, said steering shaft means comprising first and second members telescopingly nested together at one end of each of said first and second telescoping members, the other end of said first telescoping member being connected to said first yieldable member, the other end of said second telescoping member being connected to said steering gear, said telescoping members having aligned recesses in their mating surfaces, and plastic members in said recesses adapted to shear generally along the mating surfaces upon the application of a predetermined force on said other end of said second telescoping member.

9. An impact absorbing steering column as set forth in claim 2 wherein said means includes a steering shaft, said second yieldable member comprising a hollow generally cylindrical member, end heads secured to opposite ends of said hollow member, one end head being connected to said steering shaft, the other end head being connected to said steering gear, said hollow member having a relatively thin wall, said wall having a plurality of ridges therein separated from one another by a plurality of annular recesses, said hollow member, upon the application of a predetermined axial force on one end thereof, being adapted to deform in generally accordion fashion.

10. An impact absorbing steering column as set forth in claim 2 wherein said second yieldable member includes a steering shaft means, said steering shaft means comprising first and second members telescopingly nested together at one end of each of said first and second members, the other end of said first telescoping member being connected to said first yieldable member, the other end of said second telescoping member being connected to said steering gear, said telescoping members having aligned recesses in their mating surfaces, and plastic members in said recesses adapted to shear generally along the mating surfaces upon the application of a predetermined force on said other end of said second telescoping member.

References Cited

UNITED STATES PATENTS

| | | | |
|---|---|---|---|
| 3,167,974 | 2/1965 | Wilfert | 74—492 X |
| 3,373,629 | 3/1968 | Wight et al. | 74—492 |

FOREIGN PATENTS 932,027  7/1963  Great Britain.

MILTON KAUFMAN, *Primary Examiner.*

U.S. Cl. X.R.

180—78, 82; 280—87